United States Patent [19]
Koether et al.

[11] 4,113,623
[45] Sep. 12, 1978

[54] FILTER APPARATUS

[75] Inventors: Bernard G. Koether, Westport; William J. Shaughnessy, Brookfield, both of Conn.

[73] Assignee: Food Automation-Service Techniques, Inc., Stratford, Conn.

[21] Appl. No.: 790,429

[22] Filed: Apr. 25, 1977

[51] Int. Cl.² .......................................... G01D 21/16
[52] U.S. Cl. .................................. 210/167; 210/238; 210/416 R; 210/461; 210/486
[58] Field of Search ............... 210/167, 238, 461, 486, 210/470, 420, 416 DW, 416 R, 416 L

[56] References Cited

U.S. PATENT DOCUMENTS

| | | | |
|---|---|---|---|
| 1,735,007 | 11/1929 | Lanes | 210/486 |
| 2,760,641 | 8/1956 | Mies, Jr. et al. | 210/416 DW |
| 2,760,645 | 8/1956 | Mies, Jr. | 210/254 |
| 3,279,605 | 10/1966 | Shepherd | 210/167 X |
| 3,400,824 | 9/1968 | Weimea et al. | 210/238 |

FOREIGN PATENT DOCUMENTS 69,506  10/1969  German Democratic Rep. ..... 210/486

OTHER PUBLICATIONS

Filter Pro Instruction Manual by Bow Manufacturing Co. Inc. Concord, N. H., 1974.
Model A 50 and Model A-95 ReNu Vacuum Filter Bulletin, ReNu Vacuum Filter Mfg. Co., Chicago, Ill.
Operation and Maintenance Instructions Model Mf 90 and Model Mf 90 B-1 Bulletins, Dean Industries, Culver City, Ca.
Broaster Filters Take Out the Worst - Bring Out the Best Bulletin, Broaster Co., Rockton, Ill. 1976.
Portable Fat Filter Model PF-150 Bulletin, 1975.
Operating Manual P-H-T Pressure Fryers, 1974 by Henny Penny Corp., Eaton, Ohio.

*Primary Examiner*—John Adee
*Attorney, Agent, or Firm*—Wooster, Davis & Cifelli

[57] ABSTRACT

A filter apparatus comprises a tank, a pump and pump motor assembly, a filter assembly, and an inlet/outlet hose, which are modular elements easily assembled for use and disassembled for cleaning. The pump and pump motor assembly is detachably mounted to the tank by flanges including alignment pins and releasably connecting means. The filter assembly and inlet/outlet hose are attached to the pump and pump motor assembly by quick disconnect fittings which include heat insulating actuator rings. The filter assembly includes a filter intake pipe having a filter shoe mounted transversely thereto, a plenum grid which fits over the filter intake pipe and is detachably secured to the filter shoe, and a filter bag which fits over the plenum grid and is clamped between the plenum grid and filter shoe to effect a filter bag seal. The filter assembly is provided with a heat insulating handle to facilitate removing it when hot for filter bag replacement.

16 Claims, 6 Drawing Figures

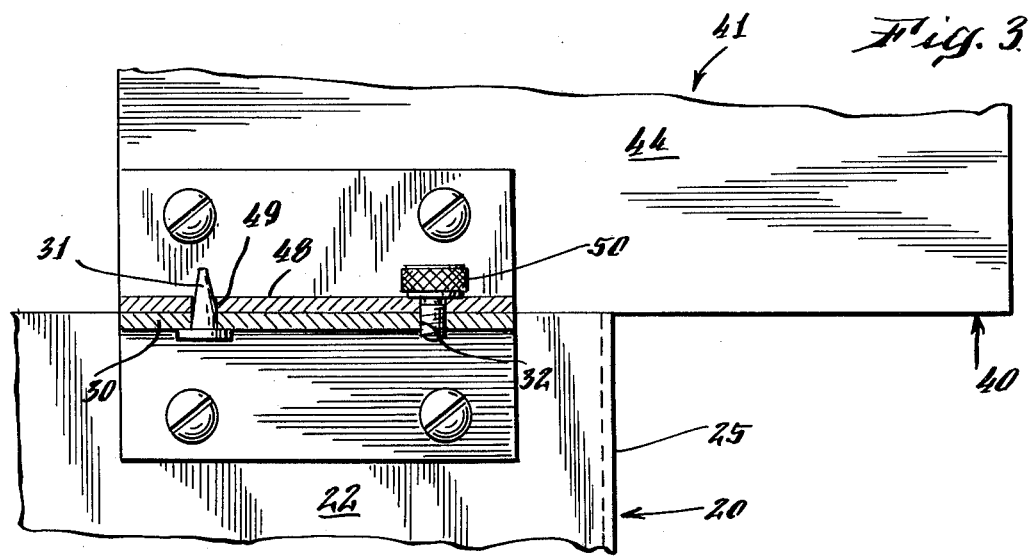
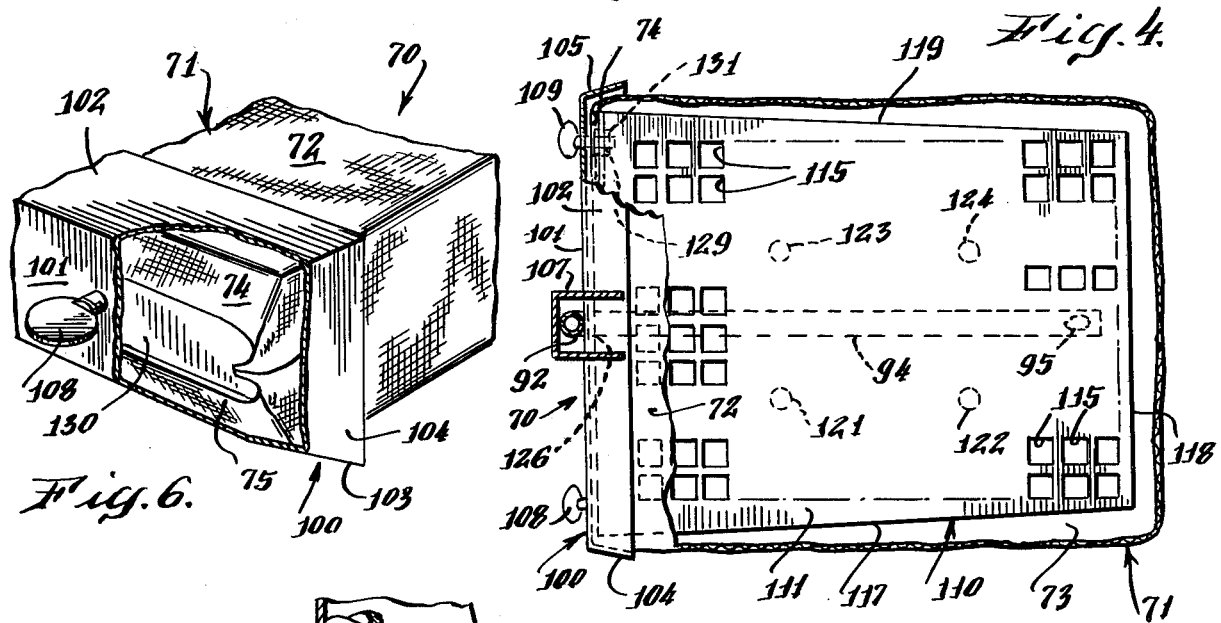
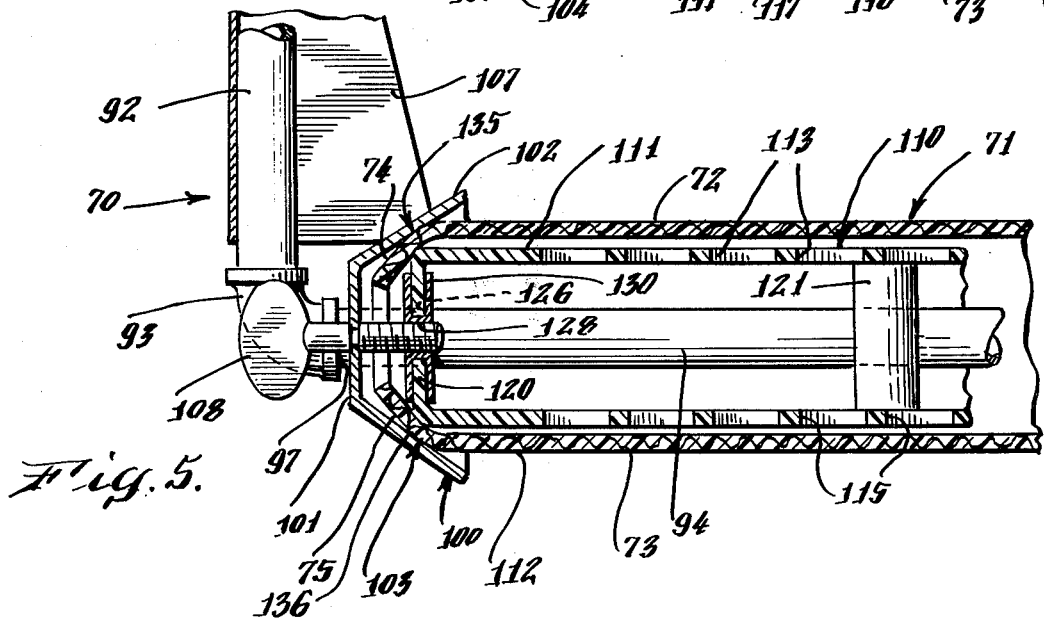

FILTER APPARATUS

The invention herein relates to a filter apparatus, and in particular to a filter apparatus adapted for cleaning cooking oil utilized in deep fat frying of foods.

BACKGROUND OF THE INVENTION

Deep fat frying is a common method of cooking food which is frequently used in fast food restaurants serving potatoes and other food items, such as chicken, fish, onion rings, and the like, which are usually covered with breading or batter. During the deep fat frying operation, these foods tend to shed particles in the form of pieces of the food items, starch granules from potatoes, flakes of breading or batter, etc. These particles continue to cook and will eventually carbonize or char if they stay in the cooking oil, and have a deleterious effect on subsequent food cooking. In particular, the overheated organic materials accelerate breakdown of the cooking oil, causing hydrolysis, oxidation, and polymerization thereof. Visible signs of breakdown soon appear in the form of smoking, uneven or almost no browning of the food, and in the final stages, foaming of the cooking oil itself. Filtering these particles from the cooking oil on a regular basis avoids or delays the difficulties, and extends the life of the cooking oil. Filtering of the cooking oil also extends the life and increases the efficiency of the fryer inasmuch as carbonized food particles assist development of polymers of the fats which coat the heating elements of the fryer, decreasing its efficiency. Finally, foods fried in clean cooking oil are of higher quality, and this is of utmost importance to the operator of a deep fat frying cooker.

It is well-known that regular filtering of the cooking oil to remove particulate contaminants therefrom will extend the life of the cooking oil, contribute to the efficient operation of the fryer, and improve the quality of the food products cooked therein. Several different types of apparatus exist in the prior art for accomplishing filtration of cooking oil, and the prior art devices encompass a broad range from a simple strainer through which the cooking oil is poured to an apparatus including a tank into which the cooking oil may be drained, filter papers and supporting assemblies, and motor driven pumps for moving the cooking oil from the fryer into the tank and for drawing the fat through the filter paper and returning it to the fryer. However, none of the known apparatus fully satisfy the needs of commercial establishments utilizing deep fat fryers and desiring to filter the cooking oil used therein.

It should be noted that in order to maximize the benefits of filtering cooking oil, it is often necessary to filter the cooking oil several times a day. The cooking oil must be in liquid form and is, therefore, generally hot during filtering and it is important that the filter apparatus minimize the possibility of the user being burned by the hot cooking oil or by parts of the filter apparatus which are made hot through contact with the cooking oil. The filter apparatus must be easy to use, and in particular, it must be easy to install and replace the filter element, even if it should become clogged in the midst of filtering a batch of hot cooking oil. It must also be easy to clean the filter apparatus. And, of course, the filter must operate in an efficient and dependable manner to quickly and effectively filter the cooking oil.

SUMMARY OF THE INVENTION

Accordingly, it is a principal object of the invention to provide an efficient and dependable filter apparatus.

It is an additional object of the invention to provide a filter apparatus which is easy and safe to use.

It is another object of the invention to provide a filter apparatus in which the filter element is easily and securely installed or replaced.

It is a further object of the invention to provide a filter apparatus in which the filter element can be replaced, if necessary, during a short interruption in a filtering process.

It is another object of the invention to provide a filter apparatus which is easily disassembled for cleaning and easily cleaned.

The filter apparatus according to the invention herein comprises four modular and separable elements, which are a tank, a pump and pump motor assembly detachably mounted to the tank, a filter assembly which connects to the pump and extends into the tank, and an inlet/outlet hose assembly which also connects to the pump. The pump and pump motor operate bidirectionally for drawing dirty cooking oil from a fryer into the tank, and for drawing the shortening from the tank through the filter assembly and returning it to the fryer via the inlet/outlet hose. The filter assembly includes an intake pipe having a concave filter shoe mounted generally transversely thereto, and a plenum grid received in a filter bag, the plenum grid being releasably secured to the filter shoe with the open end of the filter bag secured therebetween. Thus, the filter bag is easily installed or replaced, and has a positive seal to the filter assembly for "no leak" filtration. The filter assembly has a heat insulating quick disconnect fitting for attaching it to the pump, and also has a heat insulating handle, so that it can be removed from the pump and tank when hot without injury to the operator. The filter assembly also includes a tank inlet pipe for directing cooking oil drawn from the fryer into the tank, and includes spring loaded check valves on both the tank inlet pipe and the filter intake pipe for achieving a proper flow path depending upon the directional mode in which the pump is operating. The spring loaded check valves shut positively before shortening, often used as cooking oil, hardens around them, whicn ensures that they will be closed for proper flow directing upon iniation of a filtering operation. The pump and pump motor assembly is detachably mounted to the tank via alignment studs and locking screws, wherein the alignment studs provide for rapid and accurate positioning of the pump motor assembly when mounting it to the tank. The inlet/outlet hose for carrying hot shortening to and from the deep fat fryer is also provided with a heat insulating quick disconnect fitting for attaching it to the pump, as well as a heat insulating handle for manipulating the hose, and hence, all of the elements of the filter are quickly and easily disassembled for cleaning.

Accordingly, the filter assembly according to the invention herein achieves the foregoing objects of the invention as well as additional objects which will in part be obvious and will in part appear from a perusal of the following description of the preferred embodiments and the claims, taken together with the drawings.

DRAWINGS

FIG. 3 is a side elevation view, partially cut away, of the pump and pump motor assembly mounted to the tank of the filter apparatus of FIG. 1;

FIG. 4 is a top view, partially in section and cut away, of the filter assembly of the filter apparatus of FIG. 1;

FIG. 5 is a side elevation view, partially in section and cut away, of the filter assembly of the filter apparatus of FIG. 1; and FIG. 6 is a perspective view, partially cut away, of the filter assembly of the filter apparartus of FIG. 1.

The same reference numerals refer to the same elements throughout the various Figures.

DESCRIPTION OF PREFERRED EMBODIMENT

Figure 1:
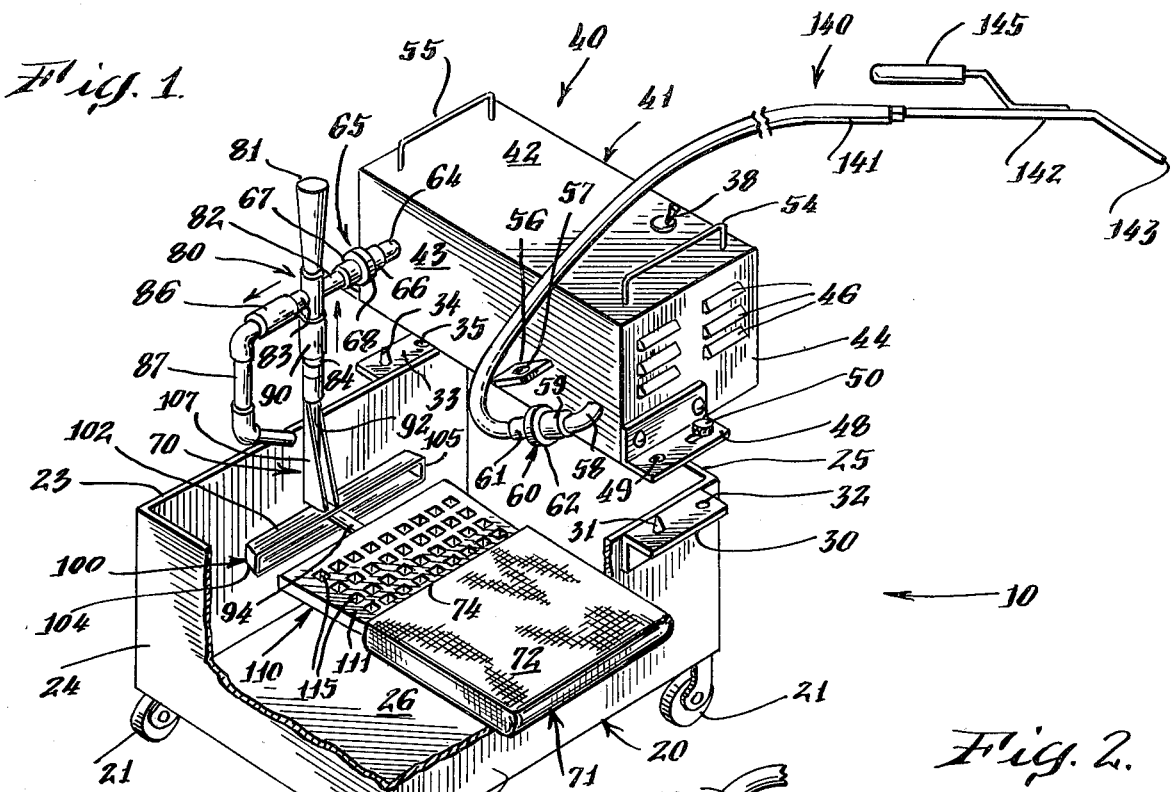
FIG. 1 is a perspective view, partially exploded, of a filter apparatus according to the invention herein.

Referring now to FIG. 1, there is shown a filter apparatus 10 according to the invention herein. The filter apparatus 10 generally comprises a tank 20, a pump and pump motor assembly 40, a filter assembly 70 and an inlet/outlet hose assembly 140.

The tank 20 may comprise an open topped box having sidewalls 22, 23, a front wall 24, a rear wall 25, and a bottom 26. The tank is preferably fabricated of stainless steel or other material which is compatible with cooking oil and easily cleaned. The tank is mounted on casters 21 to facilitate rolling the tank and the entire filter apparatus 10 of which it is a part to the fryers containing cooking oil to be cleaned by the filter apparatus. The tank 20 is provided with flanges 30, 33 mounted to the upper edges of sidewalls 22, 23, respectively. The flanges 30, 33 have alignment pins 31, 34, respectively, protruding upwardly therefrom, and are also provided with threaded openings 32, 35, respectively, all of which facilitate mounting the pump and pump motor assembly 40 to the tank 20.

The pump and pump motor assembly 40 generally comprises a housing 41 having a top 42, a front 43 and sidewalls 44, 45. The housing 41 contains a pump and pump motor on a suitable frame, which are not shown, but which are conventional. It is preferable that the pump be of the roller type to minimize breakdown of the shortening or other cooking oil in the pump. The pump and pump motor are also preferably of the bidirectional type, and the direction of operation of the pump and pump motor are controlled by a switch 38 which may conveniently be mounted on the top 42 of the housing 41. The sidewalls 44, 45 of the housing 41 have louvers 46, 47, respectively, formed therethrough to provide cooling for the pump and pump motor assembly.

A first inlet/outlet pipe 58 extends from the pump through the front panel 43 of housing 41, and the exposed end of pipe 58 is fitted with a first portion 59 of a quick disconnect fitting 60. A second inlet/outlet pipe 64 is also connected to the pump and extends through the front panel 43 of housing 41. The protruding end of pipe 64 is fitted with a first portion 66 of a quick disconnect fitting 65. As noted above, the pump and pump motor are bidirectional, with the direction of operation being controlled by switch 38. In one direction, pipe 58 comprises the inlet to the pump and pipe 64 is the outlet; in the other direction of operation pipe 64 is the inlet to the pump and pipe 58 is the outlet.

The pump and pump motor assembly 40 detachably mounts to the tank 20 by means of flanges 48 and 51, which are secured to the sidewalls 44, 45, respectively, of housing 41. The flange 48 has an opening 49 formed therethrough for receiving the alignment pin 31 of tank flange 30, and the flange 51 has a similar opening 52 formed therethrough for receiving the alignment pin 34 of tank flange 33, as best seen in FIG. 3. Thus, the pump and pump motor assembly 40 can be quickly and easily positioned with respect to the tank 20. It is secured thereto by means of thumbscrew 50 mounted through flange 48 and thumbscrew 53 mounted through flange 51, the thumbscrews being received in threaded openings 32, 35 of flanges 30, 33, respectively. Handles 54, 55 are mounted near the ends of the top 42 of the housing 41 to facilitate lifting the pump and pump motor assembly 40 into position on the tank 20.

The filter assembly 70 of the filter apparatus 10 generally comprises a filter bag 71, means for securing and supporting the filter bag, and piping for inletting cooking oil to the tank 20 and for outputting cooking oil from the tank 20 through the filter bag 71.

More particularly, the filter assembly 70 comprises a T-pipe fitting 80 to the top of which is mounted a heat insulating handle 81. One leg 82 of the T-pipe fitting 80 has mounted thereon the second portion 67 of quick disconnect fitting 65, and the second portion 67 is provided with a heat insulating ring 68 for securing and releasing the quick disconnect fitting 65. The filter assembly 70 is detachably mounted to the pump and pump motor assembly 40 by the quick disconnect fitting 65. A check valve 85 is connected to leg 83 of the T-pipe fitting 80, and a tank inlet pipe 87 is connected to the check valve 86. The check valve 86 permits flow from the T-pipe fitting through the check valve and tank inlet pipe 87 in order to fill the tank 20 with dirty cooking oil to be filtered. The check valve 86 is preferably spring loaded to close, as opposed to the type of check valve which merely closes upon reverse flow. Thus, the check valve 86 closes itself before shortening has the time to harden in it, and check valves which chose on reverse flow are sometimes held open by hardened shortening when used in cooking oil filters.

Figure 2:
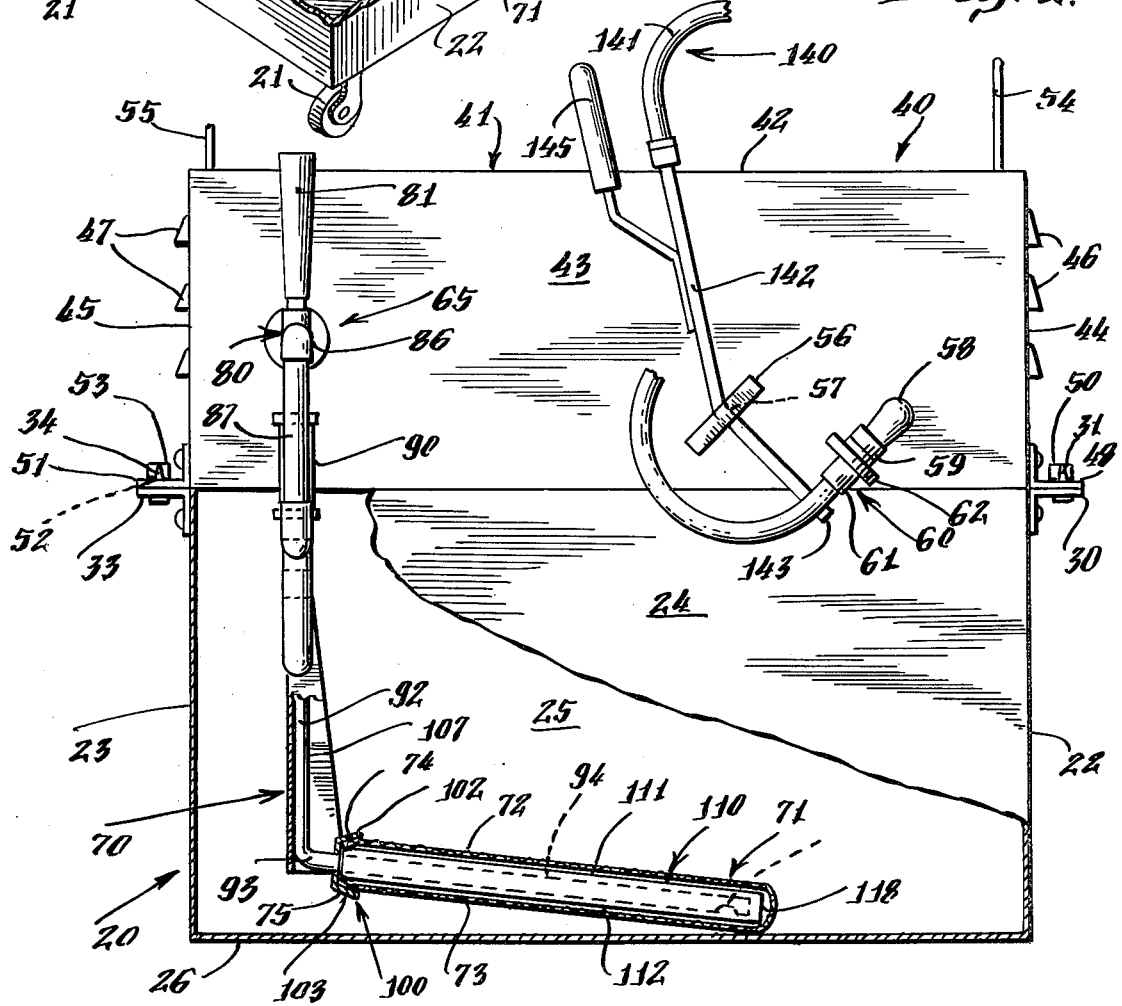
FIG. 2 is a front elevation view, partially in section, of the filter apparatus of FIG. 1.

Another check valve 90 of the same type is mounted to the third leg 84 of T-pipe fitting 80 and connects an outlet pipe 92 thereto. The outlet pipe 92 extends downwardly to an elbow 93 which connects with a filter intake pipe 94. The filter intake pipe 94 extends generally horizontally along the bottom 26 of tank 20, and it preferably slopes slightly downwardly from the elbow 93 to its free end, adjacent which is an intake opening 95, as best seen in FIG. 2.

A filter shoe 100 is mounted transversely to the filter intake pipe 94, the filter intake pipe 94 extending through the filter shoe 100 at 97. As best seen in FIGS. 4-6, the filter shoe 100 comprises a plate 101 having four integral flanges, namely top flange 102, bottom flange 103, and side flanges 104, 105, extending divergently from the plate 101, whereby the filter shoe is "concave". A bracket 107 is preferably secured to the outlet pipe 92 and the filter shoe 100 to better mount and position the filter shoe 100. The filter shoe 100 is also provided with thumbscrews 108, 109, which are freely carried in the plate 101.

The filter assembly 70 further comprises a plenum grid 110, which includes spaced-apart top panel 111 and bottom panel 112. The top and bottom panels 111, 112 are provided with a large plurality of openings 115, such that the top and bottom panels 111, 112 are similar to screens and easily pass cooking oil. The top and bottom panels 111, 112 are spaced apart by peripheral side and end walls 117-120, which may be integral with the top and bottom panels 111, 112. The top and bottom panels 111, 112 may be secured together through their peripheral side and end walls, or may be fabricated in a nesting arrangement whereby the side and end walls maintain the separation of the top and bottom panels 111, 112. Additionally, there are preferably provided four spacers 121-124 deployed between the top and bottom panels 111, 112, as best seen in FIGS. 4 and 5. The plenum grid is preferably tapered as viewed in plan (see FIG. 4) with sidewalls 117, 119 being slightly convergent as they extend from the end wall 120. The end wall 120 has an opening 125 for receiving the filter outlet pipe 94, which slides into and is accommodated in the space between the top and bottom panels 111, 112. The end wall 120 of the plenum grid 110 is also provided with two threaded openings 128, 129 in metal gussets 130, 131 for receiving the thumbscrews 108, 109, respectively, which secure the plenum grid 110 to the filter shoe 100, as best seen in FIG. 5. The plenum grid is advantageously molded of plastic, which facilitates formation of the openings 115, and also achieves a light weight structure that cools quickly. The filter element for the filter apparatus 10 is a filter bag 71, which is generally rectangular when viewed in plan in FIG. 4. The filter bag 71 generally comprises top and bottom sheets 72, 73 which are joined together along three of their sides, and define a filter bag opening by their remaining peripheral edges 74, 75. The filter bag 71 slips over the plenum grid 110, and this is facilitated by the taper of the plenum grid. The filter bag extends beyond the end wall 120 of the plenum grid 110, and the peripheral edges 74, 75 of the filter bag are folded toward each other, extending beyond the end wall 120 of the plenum grid 110, as shown in FIGS. 2, 5 and 6. The plenum grid 110 and filter bag 71 are attached to the filter shoe 100 by means of the thumbscrews 108, 109, and the peripheral edges 74, 75 of the filter bag 71 are clamped securely between the plenum grid and the filter shoe, indicated at 135, 136 in FIG. 5 and as also seen in FIG. 6, thereby effecting a positive mechanical seal which separates the interior and exterior of the filter bag. Thus, the only flow path for cooking oil in the tank 20 to the interior of the filter bag is through the bag.

The filter apparatus 10 further comprises an inlet/outlet hose assembly 140, including a flexible hose 141 one end of which is attached to the pipe 58 of the pump and pump motor assembly 40 via the second portion 61 of quick disconnect fitting 60. The second portion of the quick disconnect fitting 60 is provided with an insulating actuating ring 62 to facilitate disconnecting the hose 141 when it is still warm or hot. The other end of the hose 141 is provided with a bent nozzle 42 having an inlet/outlet opening 143, and a handle 145 made of heat insulating material is mounted to the nozzle 142. The nozzle 142 may be inserted in opening 57 formed through a bracket 56 mounted to front panel 43 of housing 41, and any cooking oil in the nozzle drains into the tank 20 when the nozzle is so positioned.

OPERATION

In utilizing the filter apparatus 10 to filter cooking oil in a fryer, the first step is to assemble the four modular elements. In particular, the pump and pump motor assembly 40 is mounted to the tank 20, the filter bag 71 and plenum grid 110 are mounted to the filter shoe 100 and the entire filter assembly 70 is secured to the pump and pump motor assembly 40, and the inlet/outlet hose assembly 140 is secured to the pump and pump motor assembly 40. The filter apparatus 10 may then be wheeled on its casters 21 to the location of the fryer.

The cooking oil in the fryer is preferably preheated, and this is, of course, necessary if the cooking oil is shortening which is hard at room temperatures. The nozzle 142 of the inlet/outlet hose assembly 140 is placed in the hot cooking oil, using the heat insulating handle 145. Switch 38 is then manipulated to operate the pump motor and pump in the directional mode in which pipe 58 is the inlet to the pump. The pump draws the cooking oil through the hose 141 and pipe 58, and pumps the cooking oil out the pipe 64 to the T-pipe fitting 80. Check valve 86 permits flow of cooking oil from the T-pipe fitting 80 through tank inlet pipe 87, whereby the cooking oil is directed into the tank 20. The check valve 90 prevents the flow of dirty oil into the interior of the plenum grid 110 and filter bag 71. After all of the cooking oil has been drawn out of the fryer, the pump motor and pump may be turned off using switch 38, and the nozzle 142 may be temporarily stored by inserting it in opening 57 in bracket 56, which supports the nozzle 142 over the tank 20 so that any cooking oil therein will drain into the tank. As soon as the fryer has cooled sufficiently, it is preferable to wipe out its interior to remove any residual dirty cooking oil and particulate contaminants.

To return filtered cooking oil to the fryer, the nozzle 142 is again placed in the fryer, using heat insulating handle 145 to manipulate it. The switch 38 is positioned to operate the pump and pump motor in their other directional mode, wherein pipe 64 is the inlet to the pump. The pump operates to draw cooking oil through the filter bag 71, thereby filtering it, and into the plenum grid 110. The cooking oil then enters the intake 95 of the filter intake pipe 94, passes through pipe 92, check valve 90, T-pipe fitting 80 and pipe 64 into the pump. The pump delivers the clean cooking oil through the hose 141 and nozzle 142 into the fryer. Check valve 86 is closed during this operation, whereby the pump does not draw air or dirty cooking oil through the tank inlet pipe 87. Because the intake 95 is positioned very near the bottom 26 of tank 20, nearly all of the cooking oil in tank 20 is filtered and returned to the fryer.

When the filter apparatus 10 is used in conjunction with a fryer of the type having a bottom drain, the dirty cooking oil can be drained directly into tank 20. The pump and pump motor can be utilized to filter the cooking oil and return the cooking oil to the fryer, and the initial flow of clean cooking oil can be utilized to flush the interior of the fryer with its drain open. The fryer drain is then closed to refill the fryer with clean cooking oil.

If the filter becomes so dirty as to clog or cease to filter effectively, the filter bag must be changed. This is accomplished by grasping the filter assembly 70 by means of heat insulating handle 81 and releasing the quick disconnect fitting 65 using the heat insulating actuator ring 68. The entire filter assembly 70 can then be lifted out of the tank 20. After it has cooled for a short time, the filter bag 71 can be replaced safely. Because of the modular design of the filter assembly 70 and the heat insulating handle 81 and heat insulating actuator ring 68 of the quick disconnect fitting 65, this can be accomplished even when the tank 20 is filled or partially filled with hot cooking oil.

The modularity of the filter apparatus 10 is particularly advantageous when the filter apparatus is used to filter shortening which hardens at room temperature. The pump and pump motor assembly can be loosened and tipped to drain any shortening, while still liquid, from the pump through inlet/outlet pipes 58, 64 into the tank 20, whereby the pump will not be clogged on subsequent start up. In most instances, merely disconnecting the filter assembly 70 and the inlet/outlet hose assembly 140 will permit sufficient drainage into tank 20 for this purpose. Similarly, the filter assembly 70 can be removed easily to clean the check valves 86, 90, should they or the pipes adjacent them become clogged with hardened shortening. These are specific examples of the overall advantages of the modular filter apparatus 10 with respect to the efficient cleaning and use thereof.

The filter apparatus 10 according to the invention herein is effective and efficient. It provides maximum filter area by using a filter bag with surfaces deployed on both sides of a plenum grid. The filter bag has a positive mechanical seal which facilitates easy installation and replacement of the filter bag and also ensures that no dirty oil will be returned to the fryer. The clean area of the filter apparatus, i.e. the area where filtered and clean cooking oil is present, is limited to the interior of the filter bag 71 and the plenum grid 110 and associated piping. Thus, the entire tank 20 is a "dirty" area and no special care is necessary in operating the filter apparatus or changing the filter bag to keep any portion of the tank clean. The modular construction of the filter apparatus also facilitates cleaning thereof.

It will be appreciated that the filter apparatus is suitable for filtering other liquids than cooking oil, and that various changes and modifications may be made from the above description of the preferred embodiment without departing from the spirit and scope of the invention, which is limited only by the following claims.

We claim:

1. A filter apparatus for filtering liquids, including cooking oil, comprising:
   A. a tank for receiving liquid to be filtered;
   B. a pump and pump motor assembly comprising a modular element of the filter apparatus detachably mounted to and at least partially above the tank;
   C. a filter assembly comprising a one-piece filter element for filtering liquid passing therethrough, the filter element having an interior and an exterior and defining an opening, a filter intake pipe defining at least one intake opening, the filter element mounted to the filter intake pipe with the filter element opening sealed to the intake pipe and the intake opening in communication with the interior of the filter element whereby liquid entering the intake opening must pass through the filter element, the intake pipe detachably mounted to the pump of the pump and pump motor assembly by means of a first quick disconnect fitting, the filter assembly being supported in the tank when so mounted and removable from the tank and pump and pump motor assembly as modular element,
whereby the filter apparatus is comprised of modular elements easily separable for cleaning, and with respect to the filter assembly, for installation or replacement of the filter element.

2. A filter assembly as defined in claim 1 wherein the filter assembly further comprises a heat insulating handle mounted to the filter intake pipe, and the first quick disconnect fitting includes a heat insulating actuator ring, whereby the filter assembly can be removed when hot for replacing the filter element.

3. A filter assembly as defined in claim 1 and further comprising:
   D. a hose, one end of which is detachably mounted to the pump of the pump and pump motor assembly by means of a second quick disconnect fitting.

4. A filter assembly as defined in claim 3 wherein the other end of the hose has a nozzle secured thereto, and further comprising a hose mount bracket secured to the pump and pump motor assembly, the hose mount bracket defining an opening for receiving and holding the hose nozzle above the tank.

5. A filter apparatus as defined in claim 3 wherein the pump and pump motor are selectively bidirectionally operable to reverse the flow through the pump, and said filter assembly further comprises an inlet/outlet pipe connected between the first quick disconnect fitting and the filter intake pipe, a tank inlet pipe connected to the inlet/outlet pipe, a first check valve interposed in the filter intake pipe between the filter element and the inlet/outlet pipe for preventing reverse flow through the filter intake pipe and filter element, and a second check valve interposed in the tank inlet pipe for preventing flow through the tank inlet pipe to the inlet/outlet pipe, whereby the tank may be filled with liquid to be filtered by inserting the hose in a supply of the liquid and operating the pump in a first direction to draw liquid through the hose and pump it into the tank through the inlet/outlet pipe and tank inlet pipe, and the liquid may be filtered by operating the pump in a second direction to draw liquid through the filter element, filter intake pipe and inlet/outlet pipe and pump the liquid out through the hose.

6. A filter apparatus as defined in claim 1 wherein the pump and pump motor assembly are detachably mounted to the tank by means of at least one pair of releasably connectable flanges, one of the pair of flanges secured to the pump and pump motor assembly and the other of the pair of flanges secured to the tank, one of the pair of flanges including a positioning pin received in an opening defined in the other of the pair of flanges to position the flanges together and to thereby also position the pump and pump motor assembly with respect to the tank, and the pair of flanges also including means for releasably connecting them together.

7. A filter apparatus as defined in claim 1 wherein the filter assembly includes a filter shoe mounted to the intake pipe with the portion of the intake pipe defining its intake opening extending through the filter shoe, a plenum grid comprising spaced-apart walls defining a plurality of openings for permitting liquid to flow therethrough, the plenum grid detachably mounted to the filter shoe with the portion of the intake pipe extending through the filter shoe positioned between the spaced-apart walls of the plenum grid, and wherein the filter element surrounds the plenum grid, the filter element defining an opening for inserting the plenum grid therein, the marginal edges of the filter element adjacent the opening being clamped between the plenum grid and the filter shoe when the plenum grid is mounted thereto.

8. A filter apparatus as defined in claim 7 wherein the filter element is a generally rectangular filter bag which is open at one end, and the plenum grid comprises parallel, spaced-apart flat top and bottom panels having a plurality of openings therethrough and means for spacing the top and bottom panels apart, said filter bag fitting over the plenum grid.

9. A filter apparatus as defined in claim 8 wherein the plenum grid includes an end wall and side walls extending between the top and bottom panels, the end wall detachably mounted to the filter shoe and the side walls converging as they extend away from the end wall to facilitate inserting the plenum grid into the filter bag.

10. A filter apparatus as defined in claim 8 wherein the plenum grid includes an end wall joining said top and bottom panels, the end wall detachably mounted to the filter shoe to secure the plenum grid thereto, and the filter shoe is concave to receive the end wall, the marginal edges of the filter bag adjacent its opening clamped between the filter shoe and the periphery of the end wall.

11. A filter apparatus as defined in claim 10 wherein said plenum grid is detachably mounted to the filter shoe by thumbscrews carried in the filter shoe and threadably received in the end wall of the plenum grid.

12. A filter assembly for filtering liquids, such as cooking oil, and adapted for use with a pump, the filter assembly comprising:
A. an intake pipe including means for connecting one end thereof to a pump, the other end defining an intake opening;
B. a filter shoe mounted to the intake pipe between its ends, with the intake pipe extending through the filter shoe;
C. a plenum grid comprising spaced-apart walls defining a plurality of openings for permitting liquid to flow therethrough, the plenum grid detachably mounted to the filter shoe with the portion of the intake pipe extending through the filter shoe positioned between the spaced-apart walls of the plenum grid; and
D. a filter element surrounding the plenum grid, the filter element defining an opening for inserting the plenum grid therein, the marginal edges of the filter element adjacent the opening being clamped between the plenum grid and the filter shoe when the plenum grid is mounted thereto,
whereby the filter element is immersed in liquid to be filtered and the pump draws liquid through the filter element, plenum grid and intake pipe, discharging filtered liquid as desired.

13. A filter assembly as defined in claim 12 wherein the filter element is a generally rectangular filter bag which is open at one end, and the plenum grid comprises parallel spaced-apart flat top and bottom panels having a plurality of openings therethrough the means for spacing the top and bottom panels apart, said filter bag fitting over the plenum grid.

14. A filter assembly as defined in claim 13 wherein the plenum grid includes an end wall and said walls extending between the top and bottom panels, the end wall detachably mounted to the filter shoe and the side walls converging as they extend away from the end wall to facilitate inserting the plenum grid into the filter bag.

15. A filter assembly as defined in claim 13 wherein the plenum grid includes an end wall joining said top and bottom panels, the end wall detachably mounted to the filter shoe to secure the plenum grid thereto, and the filter shoe is concave to receive the end wall, the marginal edges of the filter bag adjacent its opening clamped between the filter shoe and the periphery of the end wall.

16. A filter assembly as defined in claim 15 wherein said plenum grid is detachably mounted to the filter shoe by thumbscrews carried in the filter shoe and threadably received in the end wall of the plenum grid.

* * * * *